(12) United States Patent
Yatsuda et al.

(10) Patent No.: US 7,410,203 B2
(45) Date of Patent: Aug. 12, 2008

(54) GLASS RUN

(75) Inventors: Atsushi Yatsuda, Aichi-ken (JP); Yoshio Hashimoto, Aichi-ken (JP); Masanori Aritake, Aichi-ken (JP); Satoshi Toki, Aichi-ken (JP); Yukio Matsuda, Okazaki (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 11/806,954

(22) Filed: Jun. 5, 2007

(65) Prior Publication Data

US 2007/0296250 A1    Dec. 27, 2007

(30) Foreign Application Priority Data

Jun. 6, 2006    (JP)    ............ P-2006-156736

(51) Int. Cl.
    *B60J 1/08*    (2006.01)
(52) U.S. Cl. ............ 296/146.2; 296/146.1; 296/146.15; 296/146.16; 49/502
(58) Field of Classification Search .............. 296/146.1, 296/146.2, 146.15, 146.16, 93; 49/502
    See application file for complete search history.

(56) References Cited

U.S. PATENT DOCUMENTS

| 6,286,841 | B1 | 9/2001 | Foy et al. |
| 6,389,754 | B2 | 5/2002 | Nozaki |
| 6,493,992 | B2 | 12/2002 | Goto |
| 6,723,414 | B2 | 4/2004 | Aritake et al. |
| 2001/0001917 | A1 | 5/2001 | Goto |

FOREIGN PATENT DOCUMENTS

| DE | 35 32961 A1 | 3/1986 |
| JP | 2003-165340 | 6/2003 |
| WO | WO 97/08005 | 3/1997 |

OTHER PUBLICATIONS

European Search Report dated Sep. 7, 2007.

*Primary Examiner*—Lori L Lyjak
(74) *Attorney, Agent, or Firm*—McGinn IP Law Group, PLLC

(57) ABSTRACT

An automobile door has a glass run corresponding to a glass door. The glass run includes a body portion, which has a bottom wall portion, and a vehicle interior side wall portion and a vehicle exterior side wall portion respectively extending from opposite ends of the bottom wall portion, and also includes a pair of seal lips which performs sealing between the door glass and the glass run. Furthermore, in a cross-sectionally substantially-U-shaped outer peripheral portion of the body portion, sponge rubber layers are provided in a predetermined range in a longitudinal direction of a cross-section of the vehicle interior side surface wall portion and a predetermined zone including a continuously connecting portion between the bottom wall portion and the inner outer side surface wall portion, respectively. An auxiliary lip is provided at a continuously connecting portion between the bottom wall portion and the vehicle interior side wall portion. Additionally, a sponge rubber layer is formed on a door glass facing surface of the bottom wall portion.

7 Claims, 3 Drawing Sheets

GLASS RUN

BACKGROUND OF THE INVENTION

1. Field of the Invention

The present invention relates to a glass run mounted on a vehicle door.

2. Related Art

A vehicle door of an automobile or the like is provided with a glass run that seals a peripheral edge part of a door glass moved up and down. The glass run includes a cross-sectionally substantially-U-shaped body portion which has a base wall part and a pair of sidewall parts respectively extending from opposite ends of the base wall part, and also includes a pair of seal lips inwardly extending into the body portion from substantially ends of both the sidewall parts of the body portion, respectively, to seal the door glass.

Generally, the glass run is constituted by a solid elastic material having relatively high stiffness. Consequently, there is a fear of occurrence of a gap between the glass run and a door frame at the mounting of the glass run due to tolerance at the manufacture of the glass run. Accordingly, in recent years, to prevent occurrence of the gap between the glass run and the door frame, some conventional glass runs have been configured so that lip portions adapted to abut against the door frame are formed in an extended condition at the side of a doorframe facing surface of a bottom wall portion of the glass run (see, for example, JP-A-2003-165340).

However, although the lip portions of the conventional glass runs are sufficient to prevent water from infiltrating into a vehicle interior, such lip portions are insufficient for sound insulation to prevent external ambient noises and disturbing noises from infiltrating into the vehicle interior.

To solve this problem, it has been assumed to configure a vehicle so that a sponge elastic material layer put into elastic constant with a wall portion of a door frame is provided in the entirety of the cross-sectionally substantially-U-shaped outer peripheral part of the body portion to fill a relatively wider range of the gap between the glass run and the door flame therewith, as compared with the conventional case of filling the gap with the lip portions.

However, in a case where the sponge elastic material layer is provided in the entirety of the cross-sectionally substantially-U-shaped outer peripheral part of the body portion, as described above, the sponge elastic material layer does not slide along a wall portion of the door frame when the glass run is assembled to the vehicle door. Thus, the assembling of the glass run to the vehicle door by sliding the body portion therealong and pressing the body portion into an inner part of the door frame, similarly to the case of the glass run made only of the solid elastic material cannot be performed. There is a fear of reduction in assemblability. Consequently, also, there is a fear that during the assembly of the vehicle, the sponge elastic material layer ma be caught in the wall portion of the door frame, and that a caught part of this layer may break.

Also, in a case where the door glass is put into a fully closed position, there is a fear of generation of a sound of a thud, i.e., what is called a thudding sound due to impact caused when the door glass abuts against the top side portion of the glass run. In recent years, to reduce such a collision noise, some conventional glass runs have been configured so that the bottom wall portion has a buffer part. Such a glass run is configured to allow the top edge portion of the door glass to abut against the bottom wall portion of the glass run through the buffer part thereby to lessen the impact. Thus, the collision sound is reduced.

However, generally, the glass run is made of a relatively hard solid elastic material, as described above. Therefore, the conventional buffer part is insufficient for lessening the impact at the abutment of the buffer part against the door glass.

Also, conventionally, the generation of collision sounds is suppressed due to the structural properties of the glass run (or buffer part). Accordingly, in a case where a position, at which the door glass actually abuts against the bottom wall portion of the glass run, is deviated toward the exterior of a vehicle exterior, the effect of lessening the impact may be insufficiently obtained, depending upon a place of the door glass, against which the bottom wall portion of the glass run abuts.

SUMMARY OF THE INVENTION

The invention is accomplished to solve the above problems. An object of the invention is to provide a glass run enabled to improve the sound insulation, to suppress the generation of abnormal noises, and to enhance the assemblability thereof.

Hereinafter, some aspects of the invention suitable for solving the above problems are described by itemizing. Incidentally, if necessary, characteristic operations and advantages are described. in addition to the description of an associated one of such constructions.

(1) A glass run which is mounted on a door frame of a vehicle door having a door glass configured to move up and down which includes a body portion, which has a bottom wall portion, and a vehicle interior side wall portion and a vehicle exterior side wall portion respectively extending from both ends of the bottom wall portion, and a pair of seal lip portions which respectively extend from the vehicle interior side wall portion and the vehicle exterior side wall portion into the body portion and which performs sealing between the door glass and the glass run. The glass run features that at least one of a top side portion of the glass run, which corresponds to a top side of the door glass, and longitudinal portions of the glass run, which respectively correspond to longitudinal sides of the door glass, includes a first sponge elastic material layer elastically contacted with a wall portion of the door frame, which faces an outer peripheral part of the vehicle interior side wall portion, in a predetermined range of the outer peripheral part in a cross-sectionally substantially-U-shaped outer peripheral portion of the body portion made of a solid elastic material, a second sponge elastic material layer elastically contacted with a wall portion of the door frame, which faces the outer peripheral part, at a continuously connecting portion between the bottom wall portion and the vehicle exterior side wall portion or in vicinity of the continuously connecting portion, a lip portion elastically contacted with a wall portion of the door frame, which faces the outer peripheral part, at a continuously connecting portion between the bottom wall portion and the vehicle interior side wall portion or in vicinity of the continuously connecting portion, and a third sponge elastic material layer provided on a door glass facing surface of the bottom wall portion.

According to the above construction, the sponge elastic material layers elastically contacted with the wall portion of the door frame, which faces the predetermined range of the outer peripheral part of the vehicle interior side wall portion, are provided in the predetermined range of the outer peripheral part of the vehicle interior side wall portion and in the continuously connecting portion (i.e., the vehicle exterior side corner portion) between the bottom wall portion and the vehicle exterior side wall portion or in the vicinity of the continuously connecting portion in the cross-sectionally substantially-U-shaped outer peripheral portion of the body portion. Consequently, a relatively wider range of the gap between the glass run and the door frame can be filled, as compared with the conventional glass run using only lip portions. Particularly, a relatively large gap is liable to be formed between the vehicle exterior side corner portion and the wall portion of the door frame facing the vehicle exterior side corner portion. Thus, it is more preferable for more surely filling this gap that the second sponge elastic material layer strides over the vehicle exterior side corner portion and to extend to an end of the vehicle exterior side wall portion from the side of the bottom wall portion.

The sponge elastic material is more flexible, as compared with the solid elastic material. Thus, when the sponge elastic material elastically contacted with the wall portions of the door frame, the sponge elastic material easily deforms along the shapes of the wall portions. Accordingly, the sponge elastic material can absorb tolerance at the manufacture of the glass run and mounting error. For example, even in a case where a step-like part is provided in the wall portion of the door frame, the sponge elastic material can absorb the influence of the step-like part. That is, in the case of using the sponge elastic material layers, it is more difficult to form the gap, and the adhesiveness is high, as compared with the case of using the conventional lip portions made of the solid elastic material. Consequently, the following advantages can be obtained. That is, ambient noises can be prevented from infiltrating into the vehicle interior from the vehicle exterior. Accordingly, sound insulation can be enhanced. Additionally, water can be prevented from infiltrating into the vehicle interior. Vibrations can be absorbed during running. Backlash can be prevented from occurring in the state in which the glass run is mounted on the vehicle door. Impact caused at the collision of the door glass G and the glass run can be absorbed. The generation of impact sounds can be suppressed.

However, on the other hand, as described in the description of the problems, the sponge elastic material layers have the problems that the sponge elastic material layers do not slide along the wall portion of the door frame to thereby reduce the assemblability. Generally, when the glass run is assembled to the door frame, first, the vehicle exterior side part (i.e., the vehicle exterior side wall portion) is assembled thereto. Subsequently, the glass run is pushed into an inner part by sliding the continuously connecting portion between the bottom wall portion and the vehicle side wall portion (i.e., the vehicle interior side corner portion) or the vicinity thereof along the wall portion of the door frame. Then, the vehicle interior side part (i.e., the vehicle interior side corner portion) is assembled thereto. In this case where the sponge elastic material layer is provided in proximity of the vehicle interior side corner portion, the troubles described in the description of the problems occur. Accordingly, a lip portion made of a solid elastic material, which extends from the body portion, is provided like this means in the proximity of the vehicle interior side corner portion, instead of the sponge elastic material layer. Thus, when the glass run is assembled to the vehicle door by performing the above method, the fear of reduction in the assemblability can be reduced.

Conversely, in a case where a large number of lip portions made of a solid elastic material are provided to obtain advantages similar to those in the case of using the sponge elastic material layers, the stiffness at the assembly of the glass run to the vehicle door, there is a fear of making it difficult to fit the glass run into the door frame.

Further, the third sponge elastic material layer is provided on the door glass facing surface of the bottom wall portion. Thus, the impact at the abutment of the door glass can be mitigated. The generation of collision sounds can be suppressed. Such effects can be further enhanced by a synergetic effect of the first and second sponge elastic material. Incidentally, there is a fear of generation of collision sounds by collision between the door glass and the bottom wall portion, which is caused by, for example, stress at the start of moving up or down the glass, not only at the top side portion corresponding to the top side of the door glass but also at the longitudinal portions. Consequently, this means is similarly effective either at the top side portion or at the longitudinal side portion.

Further, the buffering effects are enhanced due to the structural characteristics of the glass run (or the buffer portion) in the conventional glass run. Thus, the shape of the cross-section of the glass run becomes complex. The glass run is liable to be affected by the manufacturing error and the mounting error. Consequently, there is a fear of extremely restricting the range in which the buffer portion properly functions. In this respect, the means 1 enhances the buffering effect due to the material characteristic, such as the flexibility of the sponge elastic material. Accordingly, the structure of the glass run can be simplified. Thus, uniform effects can surely be obtained in a wider range of the bottom wall portion. Therefore, in a case where a position, at which the door glass abuts against the bottom wall portion, is deviated toward the vehicle exterior, the deviation can be tolerated in a wider range.

(2) In the invention, the third sponge elastic material layer may be provided over substantially the entirety in a direction of width of the bottom wall portion.

According to the above construction, the generation of collision sounds can surely be suppressed in a wider range by providing the sponge elastic material layer over substantially the entire area in the direction of width of the bottom wall portion.

(3) In the invention, the sponge elastic material layers may be formed integrally with the body portion.

The above construction does not need an operation of preliminarily preparing the sponge elastic material layer as a separate member and retrofitting the sponge elastic material layer using an adhesive agent or double-sided tape. Thus, the operation can be simplified. Also, troubles, such as the peel-off of the sponge elastic material layer, can be reduced.

(4) In the invention, each of the sponge elastic material layers is made of a highly foamable sponge elastic material.

According to the above construction, the sponge elastic material layer is made of, for example, a highly foamable (low specific gravity) sponge elastic material (highly foamable sponge rubber) having a specific gravity ranging from 0.1 to 0.3. Consequently, the sponge elastic material layer is more flexible, as compared with the case of constituting the sponge elastic material layer by the conventional sponge elastic material having a specific gravity of 0.4 to 0.7. Thus, the operation and the advantages of each of the means can more surely be achieved.

(5) In a glass run according to the invention in which the glass run is mounted on the door frame configured to protrude a predetermined tightening member from the door frame to the body portion of the glass run. This glass run may be formed so that a range facing the tightening member is a non-forming range in which the second sponge elastic material layer is not formed in the cross-sectionally substantially-U-shaped outer peripheral portion of the body portion.

According to the above construction, even in the case of the glass run attached to the door frame configured so that the predetermined tightening member protrudes from the door frame toward the glass run, the assemblability of the glass run can be suppressed from being reduced. The tightening member is, for example, a rivet for tightening various members of the door frame, and a clip for attaching a weatherstrip to the door frame. According to the means 5, the configuration provided with the third sponge elastic material layer can more effectively achieve the effects.

(6) In the invention, the glass run may further comprise a catching protrusion portion caught by a caught portion provided in a wall portion of the door frame in the cross-sectionally substantially-U-shaped outer peripheral portion of the body portion, and at least a predetermined range at a side in a catching direction from the catching protrusion portion may be a non-forming range in which the first sponge elastic material layer and the second sponge elastic material layer are not formed.

According to the above construction, a space (i.e., the non-forming range) is formed at the side in the catching direction (i.e., a direction in which the glass run) of the catching protrusion portion. Thus, the catching protrusion portion can more surely be caught by the caught portion of the door frame. In contrast, in a case where no space is provided at the side in the catching direction, it is difficult to catch the catching protrusion portion. Also, in a case where the catching protrusion portion is made of a solid elastic material, similarly to the conventional case, the mounting state can be stabilized, as compared with a case where a part made of a low-stiffness sponge elastic material is used as the catching portion.

(7) In the invention, a vehicle exterior side panel member may be mounted on the door frame including a molding member of a bright metal or a resin.

According to the above construction, the glass run is configured so that the vehicle exterior side panel member is mounted on the door frame including a molding member of a bright metal or a resin. In the case of this configuration, a relatively large gap is liable to be formed between the glass run and the door frame. Thus, the invention achieves the effects. An example of the glass run having such a configuration is of, for example, what is called the hidden type in which the door frame includes the panel member disposed at the vehicle interior side and molding member that covers the panel member from the vehicle exterior side.

DETAILED DESCRIPTION OF THE PREFERRED EMBODIMENTS

Figure 1:
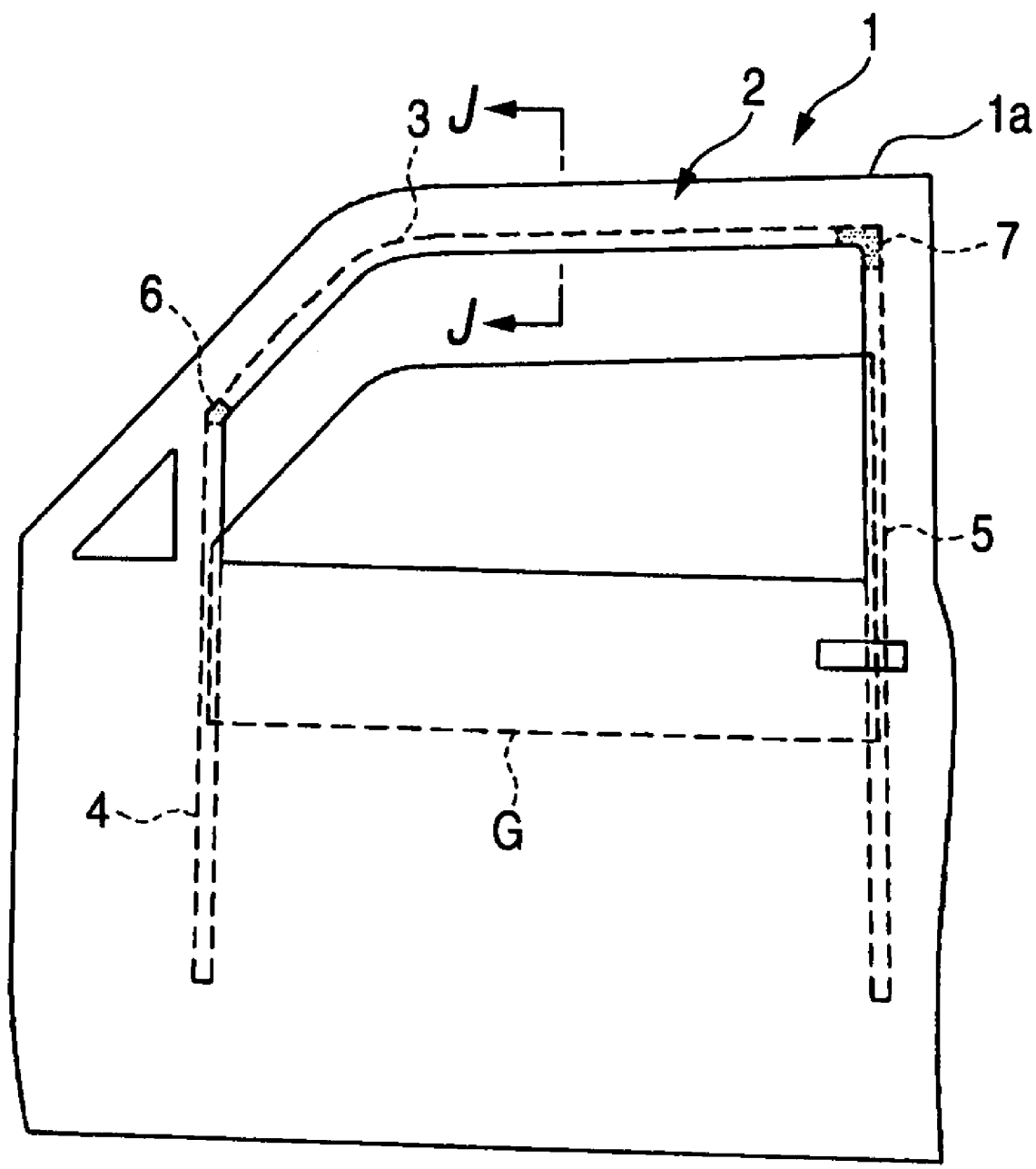
FIG. 1 is a front view illustrating a door to which a glass run is assembled.

Hereinafter, an embodiment of the invention is described in detail with reference to the accompanying drawings. As illustrated in FIG. 1, an automobile door (a front door is illustrated in FIG. 1 (hereunder referred to simply as a "door")) 1 serving as a vehicle door which is openably and closably provided in an opening portion of an automobile body acting as a vehicle body has a door glass G capable of moving upwardly and downwardly, and a glass run 2 which is made of EPDM (ethylene-propylene-diene-copolymer) rubber and has an outer shape adapted to the outer peripheral shape of the door glass G.

The glass run 2 includes an extrusion molded part 3 corresponding to the top side part in the longitudinal direction thereof, extrusion molded parts 4 and 5 respectively corresponding to front and rear longitudinal side portions, and die formed parts 6 and 7 (designated by dot patterns in FIG. 1) connecting end parts of the extrusion molded parts 3, 4, and 5. Each of the extrusion molded parts 3, 4, and 5 is formed by an extruder (not shown) to have a substantially linear shape (or an elongated shape). The die formed parts 6 and 7 are connect-formed by a die apparatus (not shown) so that the two extrusion-molded parts 3 and 4 are connected to each other at a predetermined angle, and that the two extrusion-molded parts 3 and 5 are connected to each other at a predetermined angle.

Figure 2:
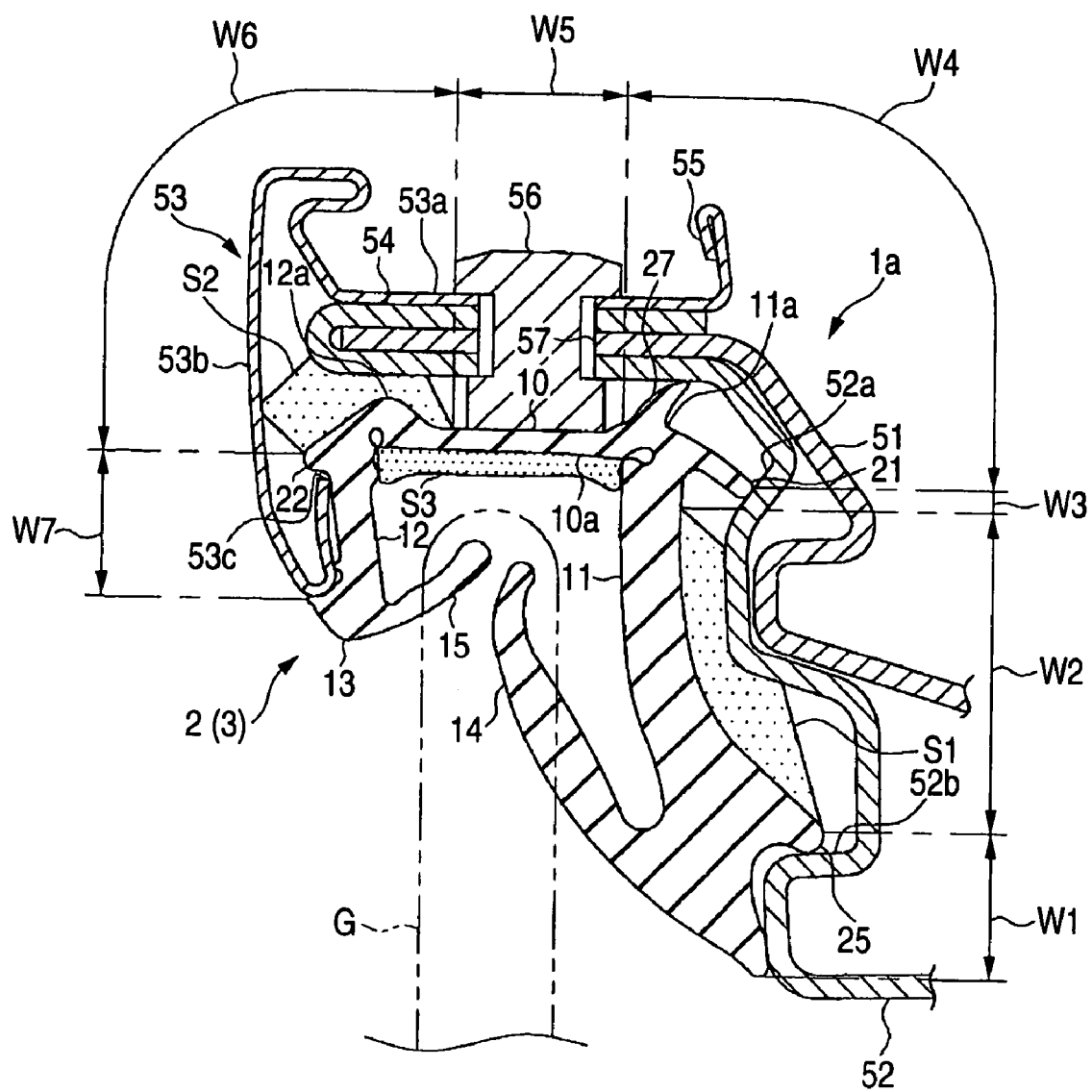
FIG. 2 is a partially cross-sectional view illustrating an assembly structure of a glass run, which is taken on line J-J shown in FIG. 1.

Next, the configuration of the glass run 2 and that of the door frame 1a of the door 1, on which the glass run 2 is mounted, are described in detail according to the configuration of the top side part of the door 1 with reference to FIG. 2. FIG. 2 is a cross-sectional view taken on line J-J shown in FIG. 1.

The top side part of the door frame 1a includes an inner panel 51 and an outer panel 52, which serve as door panel members disposed in a vehicle interior side of the door glass G, and also includes the molding member 53 attached to the panels 51 and 52. More particularly, a vehicle exterior side end portion of the outer panel 52 is bend-formed to sandwich a vehicle interior side end portion of the inner panel 51. Consequently, a flange portion 54 extending in a vehicle exterior side direction is formed. Additionally, the molding member 53 is attached to the flange 54.

The molding member 53 is made of a bright metal or a resin and has a mounting portion 53a mounted along the flange portion 54, and a longitudinal wall portion 53b formed along an up-down direction at the vehicle exterior side of the mounting portion 53a. Also, a cross-sectionally substantially-C-shaped retainer 55, to which a weatherstrip (not shown) is attached, is formed above the top side of the mounting portion 53a. In the present embodiment, the molding member 53 corresponds to a door panel member (or a panel member) disposed at the vehicle exterior side of the door glass G.

Also, the inner panel 51, the outer panel 52, and the molding member 53 are integrally joined by being fixed with a rivet 56 serving as a tightening member through a hole portion 57 formed in the flange portion 54 and the mounting portion 53a. A door frame 1a according to the present embodiment is of what is called the hidden type, whose vehicle exterior side is covered with the molding member 53, and is configured to have no cross-sectionally substantially-U-shaped channel into which the glass run 2 is fit. Accordingly, the glass run 2 is mounted between the outer panel 52 and the molding member 53.

Next, the top side portion (the extrusion molded portion) 3 of the glass run 2 is described below. The top side portion 3 of the glass run 2 includes a cross-sectionally substantially-U-shaped body portion 13, which has a bottom wall portion 10, and a vehicle interior side wall portion 11 and a vehicle exterior side wall portion 12 respectively extending from both ends of the bottom wall portion 10, and also includes a pair of seal lips 14 and 15 which extends from the vehicle interior side wall portion 11 and the vehicle exterior side wall portion 12 and which performs sealing between the door glass G and the glass run 2. Incidentally, the vehicle exterior side wall portion 12 is formed to be relatively short, as compared with the vehicle interior side wall portion 11. Thus, the vehicle exterior side seal lip 15 can be set to be relatively small (or short), as compared with the vehicle interior side seal lip 14. Consequently, a vehicle exterior side surface of the molding member 53 (or the longitudinal wall portion 53b) can be set to be short, so that the appearance of the glass run 2 is improved. Also, flush-surface formation is performed so that the vehicle exterior side surface of the molding member 53 is substantially flush with the vehicle exterior side surface of the door glass G.

Further, catching lips 21 and 22 serving as catching projection portions, each of which outwardly extends from the vicinity of an associated one of continuously connecting portions 11a and 12a, are formed in the vehicle interior side wall portion 11 and the vehicle exterior side wall portion 12, respectively. In a state in which the glass run 2 is mounted on the vehicle door, the vehicle interior side catching lip 21 is caught by an inclination portion 52a serving as a caught portion formed in the outer panel 52. On the other hand, the vehicle exterior side catching lip 22 is caught by an end part 53c of the longitudinal wall portion 53b bend-formed as a caught portion. Additionally, a holding lip 25 serving as a catching projection portion is formed in the vicinity of an end part of the vehicle interior side wall portion 11 to extend outwardly therefrom. Further, in the state in which the glass run 2 is mounted on the vehicle door, the holding lip 25 is caught by a step-like 52b serving as a caught portion formed in the outer panel 52. With this configuration, the body portion 13 of the glass run 2 is held on the inner side of the door frame 1a.

Also, according to the present embodiment, in the substantially U-shaped outer peripheral portion of the body portion 13, sponge rubber layers S1 and S2 serving as sponge elastic material layers put in elastic contact with wall portions of the door frame 1a, which face each other, are provided in a predetermined range W2 in a longitudinal direction of a cross-section of the vehicle interior side surface wall portion 11 and a predetermined zone W6 including a continuously connecting portion 12a between the bottom wall portion 10 and the inner outer side surface wall portion 12, respectively. Incidentally, the sponge rubber layer S1 corresponds to a first sponge elastic material layer of the present embodiment. The sponge rubber layer S2 corresponds to a second sponge elastic material layer of the present embodiment. Additionally, in the predetermined zone W6, the sponge rubber layer S2 is provided to stride over the continuously connecting portion 12a and to extend to an end of the catching lip 22 from the side of the bottom wall portion 10.

Meanwhile, in a predetermined zone W4 including the continuously connecting portion 11a between the bottom wall portion 10 and the vehicle interior side wall portion 11, an auxiliary lip 27 serving as a lip portion elastically contacted with the wall portion (or the outer panel 52) of the door frame 11a is formed to extend outwardly from the continuously connecting portion 11a or from the vicinity thereof.

Further, no sponge rubber layers are provided in predetermined ranges W3, W7, and W1, which are placed lower than the catching lips 21 and 22 and the holding lip 25 (at the side in the catching direction) and which are sponge-rubber-layer non-forming ranges. Consequently, a space is formed under the catching lips 21 and 22 and the holding lip 25. Thus, the catching portions can more surely be caught by the door frame 1a.

Also, no sponge rubber layer is provided in a range W5 which faces the rivet 56 protruding from the flange portion 54 and which is a sponge-rubber-layer non-forming range. Consequently, the assemblability of the glass run 2 is suppressed from being reduced.

Additionally, a sponge rubber layer S3 is formed over substantially the entire area in the direction of width of the door glass facing surface 10a (i.e., substantially the entire area in the lateral direction, as viewed in FIG. 2) of the bottom wall portion 10 in the present embodiment as a third sponge elastic material layer.

Incidentally, as described above, the glass run 2 is made of EPDM rubber. In the glass run 2, the body portion 13, the seal lips 14 and 15, the catching lips 21 and 22, the holding lip 25, and the auxiliary lip 27 are made of EPDM slid rubber (i.e., a solid elastic material). In contrast, the sponge rubber layers S1, S2, and S3 of the present embodiment are made of highly foamable EPDM sponge rubber, which is highly flexible and has a specific gravity ranging from 0.1 to 0.3, as compared with normal sponge rubber whose specific gravity ranges from about 0.4 to about 0.7. Incidentally, the sponge rubber layers S1, S2, and S3 are formed integrally with the body portion 13 when the top side portion 3 of the glass run 2 is extrusion-molded.

Figure 3:
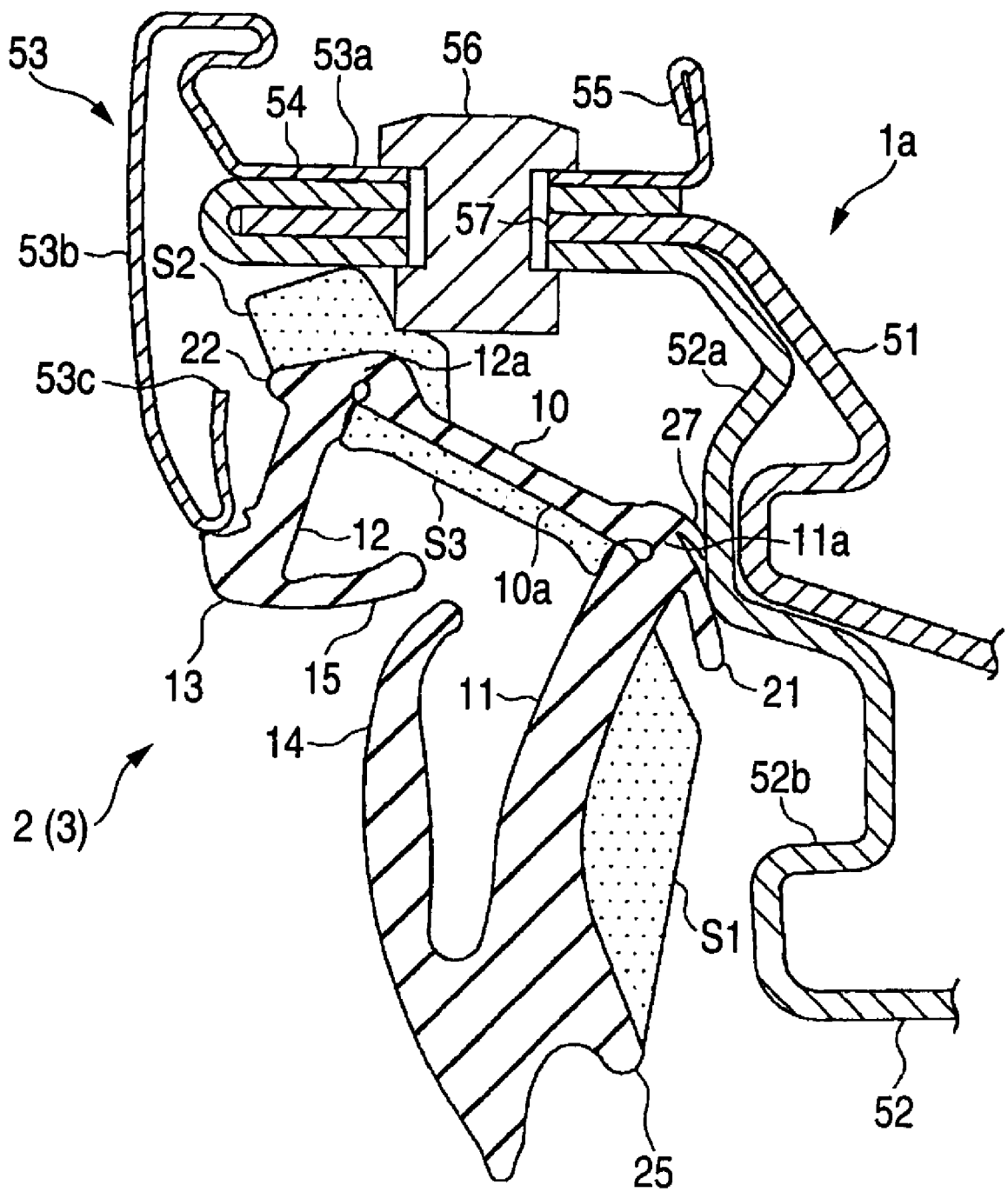
FIG. 3 is a view illustrating an assembly process of a glass run.

A method of assembling the glass run 2 to the door frame 1a is performed as follows. As illustrated in FIG. 3, a part around the auxiliary lip 27 is slid along the outer panel 52 while the vehicle exterior side wall portion 12, which is formed to be relatively short, as compared with the vehicle interior side wall portion 11, is assembled to the molding member 53. Thus, the body portion 13 is pressed into an inner part to thereby assemble the vehicle interior side wall portion 11 is assembled to the outer panel 52. The reason for assembling the vehicle exterior side wall portion to the molding member 53 earlier is that a depth to the flange 54, to which the bottom wall portion 10 is opposed, is small, that the vehicle exterior wall portion 12 can easily be assembled to the molding portion 53 even in a case where the vehicle exterior wall portion 12 has the sponge rubber layer S2. Thus, the vehicle exterior wall portion 12 can easily be employed as a starting point for assembling.

As described in detail, according to the present embodiment, at the predetermined parts of the cross-sectionally substantially-U-shaped outer peripheral part of the body portion 13, the sponge rubber layers S1 and S2 elastically contacted with the wall portions of the door frame 1a, which face the predetermined parts, are provided. Consequently, a relatively wider range of the gap between the glass run 2 and the door frame 1a can be filled, as compared with the conventional case of using only the lip portions.

Also, the sponge elastic material is flexible, as compared with the solid elastic material. Thus, when the sponge rubber layers S1 and S2 elastically contacted with the wall portions of the door frame 1a, the sponge rubber layers S1 and S2 easily deform along the shapes of the wall portions. Accordingly, the sponge elastic material can absorb tolerance at the manufacture of the glass run and mounting error. For example, even in a case where a step-like part is provided in the wall portion of the door frame 1a, the sponge elastic material can absorb the influence of the step-like part. That is, in the case of using the sponge rubber layers S1 and S2, it is more difficult to form the gap, and the adhesiveness is high, as compared with the case of using the conventional lip portions made of the solid elastic material. Consequently, the following advantages can be obtained. That is, ambient noises can be prevented from infiltrating into the vehicle interior from the vehicle exterior. Accordingly, sound insulation can be enhanced. Additionally, water can be prevented from infiltrating into the vehicle interior. Vibrations can be absorbed during running. Backlash can be prevented from occurring in the state in which the glass run is mounted on the vehicle door. Impact caused at the collision of the door glass G and the glass run can be absorbed. The generation of impact sounds can be suppressed.

Moreover, the auxiliary lip 25 made of solid rubber is formed at the continuously connecting portion 11*a* between the bottom wall portion 10 and the vehicle interior side wall portion 11 of the body portion 13 or in the vicinity of the continuously connecting portion 11*a*, instead of the sponge rubber layer. Consequently, an operation of assembling the glass run 2 to the vehicle door by sliding the body portion 13 the outer panel 52 around the auxiliary lip 27 and pressing the body portion 13 into an inner part of the door frame can be performed. Therefore, the assemblability of the glass run 2 can be enhanced, as compared with the case of providing the sponge elastic material layer around the continuously connecting portion 11*a*.

Additionally, according to the present embodiment, the sponge rubber layer S3 is provided on the door glass facing surface 10*a* of the bottom wall portion 10. Thus, the impact at the abutment of the door glass G is alleviated. The generation of impact sounds is suppressed. According to the present embodiment, buffering effects are enhanced due to material characteristics such as the flexibility of the sponge rubber. Accordingly, the structure of the glass run 2 can be simplified, as compared with the conventional configuration which enhances the buffering effects due to the structural characteristics of the glass run 2 (or the buffer portion). In a wider range of the bottom wall portion 10, uniform effects can be assured. Therefore, even in a case where the position, at which the door glass G abuts against the glass run, is deviated from the set position toward the vehicle interior or the vehicle exterior, this deviation can be tolerated in a wider range. Such advantages can be enhanced by a synergetic effect of the sponge rubber layers S1 and S2.

In the case of the present embodiment configured so that the tightening member, such as the rivet 56, is protruded from the door frame 1*a* to the glass run 2, unless the thickness of the bottom wall portion 10 of the glass run including the bottom wall portion 10 is set to be relatively thin, there is a fear of occurrence of an obstacle when the door glass G is put into a fully closed position. In this respect, according to the present embodiment, the thickness of the bottom wall portion can be thinner, as compared with the conventional glass run provided with the buffer portion. Accordingly, the present embodiment can more effectively produce the effects in a case where the tightening member is attached to the door frame 1*a*. Examples of the tightening member are a clip for attaching the weatherstrip to the door frame 1*a*, in addition to the rivet 56.

Incidentally, the invention is not limited to the above embodiment described in the foregoing description. For example, the invention can be carried out as follows. Apparently, other applications and alterations of the invention, which are not exemplified in the following description, can be made.

(a) According to the present embodiment, the invention is embodied in the front door glass run 2. However, a part, to which the door employing such a glass run is placed, is not limited to the front door. The glass run according to the invention can be applied to, for example, a rear door. Accordingly, a part of a glass run, to which the above configuration according to the present embodiment is applied, is not limited to the top side part of the glass run 2. The above configuration according to the present embodiment can be applied to a longitudinal side part of a glass run.

(b) A range, in which the sponge rubber layer according to the invention is foamed, is not limited to that described in the foregoing description of the embodiment. This range can suitably be changed according to the shape of the door frame and to the structure in which the glass run according to the invention is mounted. Therefore, according to circumstances, the sponge rubber layers can be provided in the predetermined ranges W3, W7, and W1, which are lower than the catching lips 21 and 22 and the holding lip 25 (i.e., in the catching-side direction). It is sufficient that no sponge rubber layer is provided at least around the continuously connecting portion 11*a* between the bottom wall portion 10 and the vehicle interior side wall portion 11.

(c) Although EPDM is employed as the elastic material constituting the glass run in the above embodiment, another elastic material, for example, TPO (thermoplastic olefin) can be employed as the elastic material constituting the glass run.

(d) Although highly foamable sponge rubber, whose specific gravity ranges from 0.1 to 0.3, is employed as the material of the sponge rubber layer, the material of the sponge rubber layer according to the invention is not limited thereto. Normal sponge rubber, whose specific gravity ranges from 0.4 to 0.7, can be employed as the material of the sponge rubber layer.

(e) In the above embodiment, the sponge rubber layer S3 is formed over substantially the entire area in the direction of width of the door glass facing surface 10*a* of the bottom wall portion 10. However, the range, in which the sponge rubber layer S3 is formed, is not limited to thereto in the above embodiment and may be, for example, a substantially central portion in the direction of width of the door glass facing surface 10*a*.

What is claimed is:

1. A glass run mounted on a door frame of a vehicle door having a door glass configured to move up and down, said glass run including:

a body portion, which has a bottom wall portion, and a vehicle interior side wall portion and a vehicle exterior side wall portion respectively extending from opposite ends of said bottom wall portion, said vehicle interior side wall portion having a catching lip and a holding lip; and a pair of seal lip portions which respectively extend from said vehicle interior side wall portion and said vehicle exterior side wall portion into said body portion and which performs sealing between said door glass and said glass run, wherein at least one of a top side portion of said glass run corresponds to a top side of said door glass, and vertically longitudinal portions of said glass run respectively correspond to vertically longitudinal sides of said door glass, said glass run includes:

a first sponge elastic material layer elastically contacted with a wall portion of said door frame, which faces an outer peripheral part of said vehicle interior side wall portion, in a first portion between said catching lip and said holding lip of said outer peripheral part in a cross-sectionally substantially-U-shaped outer peripheral portion of said body portion made of a solid elastic material;

a second sponge elastic material layer elastically contacted with a wall portion of said door frame, which faces said outer peripheral part, at a portion between said bottom wall portion and said vehicle exterior side wall portion or in vicinity of said portion between said bottom wall portion and said vehicle interior side wall portion;

a catching lip portion elastically contacted with a wall portion of said door frame, which faces said outer peripheral part, at a portion between said bottom wall portion and said vehicle interior side wall portion or in vicinity of said portion between said bottom wall portion and said vehicle interior side wall portion; and a third sponge elastic material layer provided on a door glass facing surface of said bottom wall portion.

2. The glass run according to claim 1, wherein said third sponge elastic material layer is provided over substantially an entirety in a direction of width of said bottom wall portion.

3. The glass run according to claim 1, wherein said sponge elastic material layers are formed integrally with said body portion.

4. The glass run according to claim 1, wherein each of said sponge elastic material layers comprises a highly foamable sponge elastic material.

5. The glass run according to claim 1, in which said glass run is mounted on said door frame configured to protrude a tightening member from said door frame to said body portion of said glass run, wherein said cross-sectionally substantially U-shaped outer peripheral portion of the body portion includes a third portion, facing said tightening members, in which said second sponge elastic material layer is not formed.

6. The glass run according to claim 1, wherein said catching lip portion is caught by the caught portion provided in the wall portion of said door frame in the cross-sectionally substantially-U-shaped outer peripheral portion of said body portion, wherein at least said first sponge elastic material layer and said second sponge elastic material layer are not formed in a vicinity of said catching lip portion toward which said catching lip portion is deformed.

7. The glass run according to claim 1, wherein a vehicle exterior side panel member is mounted on said door frame including a molding member of a bright metal or a resin.

* * * * *